UNITED STATES PATENT OFFICE.

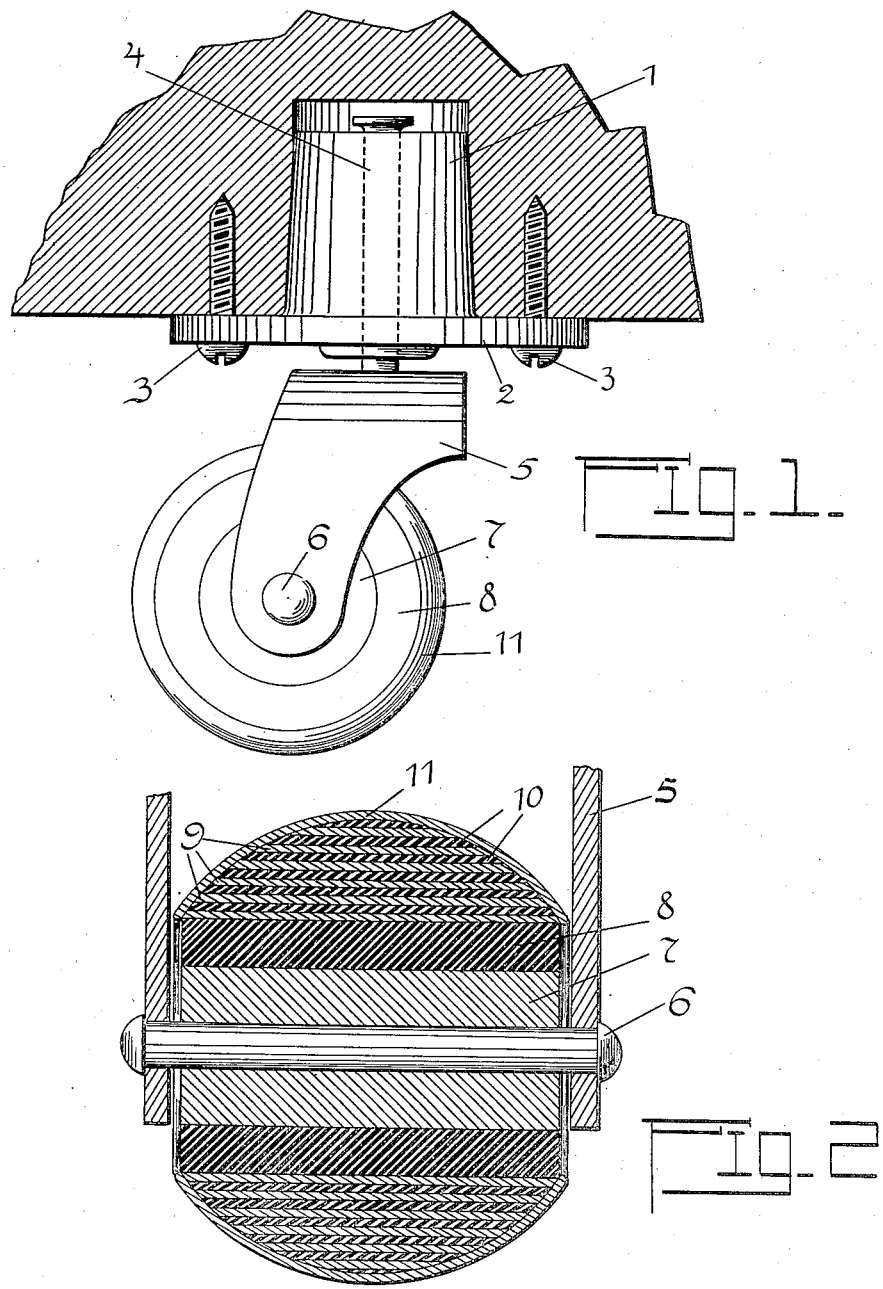

JOHN W. PEPPLE, OF SAN ANTONIO, TEXAS.

CASTER-WHEEL.

1,118,227. Specification of Letters Patent. Patented Nov. 24, 1914.

Application filed June 16, 1913. Serial No. 773,350.

*To all whom it may concern:*

Be it known that I, JOHN W. PEPPLE, a citizen of the United States, residing at San Antonio, in the county of Bexar and State of Texas, have invented certain new and useful Improvements in Caster-Wheels, of which the following is a specification.

My invention relates to a new and useful caster roller.

The object of my invention is to provide a caster roller having a resilient covering rigidly secured to its peripheral face, so that a piece of furniture mounted upon such rollers may be moved over polished floors without marring or scratching the same.

Another object is to provide a caster roller that will have a considerable portion of its under side forming a supporting surface thereby making the roller less liable to dint or mar a floor than is the case with the ordinary roller having a very small supporting surface.

A further object is to provide a caster roller having an outer covering that will permit the direction of travel of the roller to be changed without giving rise to much friction.

Finally the object of the invention is to provide a device of the character described, that will be strong, durable, simple and efficient, and comparatively easy to construct.

With these and various other objects in view, my invention has relation to certain novel features of the construction, an example of which is described in the following specification and illustrated on the accompanying drawing, wherein:

Figure 1 is a view showing in side elevation a furniture caster provided with my novel caster roller. Fig. 2 is an axial sectional view of the roller.

Referring now more particularly to the drawing wherein like reference characters designate similar parts in both the figures, the numeral 1 denotes a caster bearing adapted to be recessed in the bottom of a piano or other piece of furniture and provided with an annular flange 2 at its lower end through which will pass screws 3 securing the bearing to the piece of furniture. In the bearing 1, there is centrally journaled a pivot pin 4, rigidly carrying at its lower end an ordinary bifurcated caster bearing 5. The pin 4 will preferably be headed at its upper extremity to prevent its escape from the bearing 1. The furcations of the member 5 support the extremities of a horizontal pin 6 upon which is mounted my novel roller.

It is to be understood that the particular type of caster frame above described is not claimed by me as new since my novel roller is adapted for use in any kind of caster frame. My roller is formed with an inner core 7 which is mounted to turn upon the pin 6 and may be formed of wood, metal or any other firm material. Upon this core is mounted fast a sleeve or bushing 8 of vulcanized rubber, entirely covering the peripheral surface of said core. Upon the rubber sleeve or bushing 8, are wound a plurality of cloth strips 9 alternating with soft rubber strips or layers 10 having the necessary adhesive qualities to hold the strips 9 in place. As the strips 9 and 10 are successively applied to the core 8, they are gradually reduced in width, so as to produce a transversely rounded surface. This surface is covered with one or two layers of a soft white fabric 11 such as felt or wool. Thus it will be seen that none of the rubber entering into the construction of the roller comes into contact with the surface supporting the same, so that when the direction of travel of the roller is changed, a comparatively small amount of friction will result. The outer covering 11 of the roller furthermore serves to prevent the rubber strips or layers 10 from being forced from between the strips 9 due to any weight resting upon the roller. The cloth strips 9 prevent the extreme outer portion of the rubber from flattening due to any weight supported by the roller. The outer covering 11 will be formed of strong and durable material that will not readily wear out. It will be understood that the under surface of the roller will be flattened out somewhat when supporting any weight, owing to the rubber 8 and 10 embodied in the roller construction. The possibility of the roller dinting or scarring the floor is decreased by the provision of an increased supporting surface.

A roller constructed as above described is much superior to the ordinary caster roller since it will not injure or mar varnished or stained floors or floors formed of soft wood.

The invention is presented as including all such modifications and changes as properly come within the scope of the following claims.

What I claim is:

1. A caster roller, comprising a core, a hard rubber sleeve rigidly mounted upon the peripheral face of said core, and a coating mounted upon said sleeve, comprising one or more strips of fabric.

2. A caster roller, comprising a core, a hard rubber sleeve rigidly mounted upon the peripheral face of said core, and a coating mounted upon said sleeve comprising one or more strips of a fabric alternating with layers of soft rubber, the adhesive quality of which serves to hold said fabric strips together.

3. A caster roller, comprising a core, a hard rubber sleeve rigidly mounted upon the peripheral face of said core, a coating mounted upon the peripheral face of the rubber sleeve comprising one or more strips of fabric, alternating with a coating of soft rubber which acts as an adhesive to hold the strips of fabric together and an outer covering of yieldable material upon the peripheral face of the roller.

4. A caster roller, comprising a core, a covering of elastic material confined on the sleeve, and a facing of pliable material applied to the rounded surface of the covering and concealing the same.

In testimony whereof I have signed my name to this specification in the presence of two subscribing witnesses.

JOHN W. PEPPLE.

Witnesses:
R. L. CHALK,
HARRY HYMAN.